US011811615B1

(12) United States Patent
Rafferty et al.

(10) Patent No.: US 11,811,615 B1
(45) Date of Patent: Nov. 7, 2023

(54) SYSTEMS AND METHODS FOR DYNAMIC MODIFICATION OF EVENTS BASED ON BANDWIDTH AVAILABILITY

(71) Applicant: Capital One Services, LLC, McLean, VA (US)

(72) Inventors: Galen Rafferty, Mahomet, IL (US); Samuel Sharpe, Cambridge, MA (US); Jeremy Goodsitt, Champaign, IL (US); Grant Eden, San Francisco, CA (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/818,952

(22) Filed: Aug. 10, 2022

(51) Int. Cl.
*H04L 41/16* (2022.01)
*G06N 20/00* (2019.01)
*H04L 41/0896* (2022.01)
*G06F 18/214* (2023.01)

(52) U.S. Cl.
CPC ............ *H04L 41/16* (2013.01); *G06F 18/214* (2023.01); *G06N 20/00* (2019.01); *H04L 41/0896* (2013.01)

(58) Field of Classification Search
CPC ... H04L 41/16; H04L 41/0896; G06F 18/214; G06N 20/00
See application file for complete search history.

(56) References Cited

U.S. PATENT DOCUMENTS

2007/0180119 A1* 8/2007 Khivesara ............... H04L 47/70
709/226
2021/0314238 A1* 10/2021 Cioffi .................. H04L 41/5006

\* cited by examiner

*Primary Examiner* — Michael Won
(74) *Attorney, Agent, or Firm* — Perkins Coie LLP

(57) ABSTRACT

Methods and systems are described herein for modifying scheduled events based on bandwidth availability. To modify the scheduled event, the system determines a plurality of user devices corresponding to an event. The system receives first network conditions for a first user device and generates a feature input based on the first network conditions. The system inputs the feature input into an artificial intelligence model to determine a first available bandwidth metric and aggregates the first available bandwidth metric with respective available bandwidth metrics for other user devices of the plurality of user devices to determine a composite available bandwidth metric. The system can compare the composite available bandwidth metric to a threshold available bandwidth metric and in response to determining that the composite available bandwidth metric equals or exceeds the threshold available bandwidth metric, the system generates for display, on a user device interface, a recommendation for modifying the event.

20 Claims, 4 Drawing Sheets

SYSTEMS AND METHODS FOR DYNAMIC MODIFICATION OF EVENTS BASED ON BANDWIDTH AVAILABILITY

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results. These technical problems present an inherent problem with attempting to use an artificial intelligence-based solution in modifying scheduled events based on bandwidth availability for a plurality of devices across a disparate computer network.

SUMMARY

Methods and systems are described herein for novel uses and/or improvements to artificial intelligence applications. As one example, methods and systems are described herein for modifying scheduled events based on bandwidth availability for a plurality of devices across a disparate computer network.

Existing systems fail to be able to modify scheduled events based on bandwidth availability for a plurality of devices across a disparate computer network because they lack a mechanism to determine when user devices may lack bandwidth availability. As cited above, key benefits of artificial intelligence are its ability to process data, find underlying patterns, and/or perform real-time determinations. However, the difficulty in adapting artificial intelligence models for this practical benefit poses several technical challenges as artificial intelligence models have a fundamental requirement for high-quality and abundant training data.

To overcome these technical deficiencies in adapting artificial intelligence models for this practical benefit, methods and systems are disclosed herein that generate the high-quality and abundant training data. For example, the system collects available bandwidth metrics based on historic network condition data corresponding to a plurality of previous events and event modification data for the plurality of previous events. By doing so, the system may now train an artificial intelligence model on this data. Having overcome the initial technical hurdle of a lack of training data, the system may now apply the artificial intelligence model in a novel and unconventional manner. Specifically, the system may train the artificial intelligence model to determine whether a user device is likely to modify an upcoming event based on device-specific network conditions.

In some aspects, methods and systems for modifying scheduled events based on bandwidth availability are described. For example, the system may determine, based on user device inputs indicating a participation at an event and a plurality of user devices corresponding to the event, wherein the event occurs at a first time. The system may receive, at a second time, first network conditions for a first user device of the plurality of user devices, wherein the second time is prior to the first time, wherein the first network conditions indicate a level of background noise at a location of the first user device. The system may generate a feature input based on the first network conditions. The system may input the feature input into an artificial intelligence model to determine a first available bandwidth metric for the first user device, wherein the artificial intelligence model is trained to determine available bandwidth metrics based on historic network conditions corresponding to a plurality of previous events and event modification data for the plurality of previous events. The system may aggregate the first available bandwidth metric with respective available bandwidth metrics for other user devices of the plurality of user devices to determine a composite available bandwidth metric for the plurality of user devices. The system may compare the composite available bandwidth metric to a threshold available bandwidth metric. The system may, in response to determining that the composite available bandwidth metric equals or exceeds the threshold available bandwidth metric, generate for display (e.g., on a user device interface), a recommendation for modifying the event.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
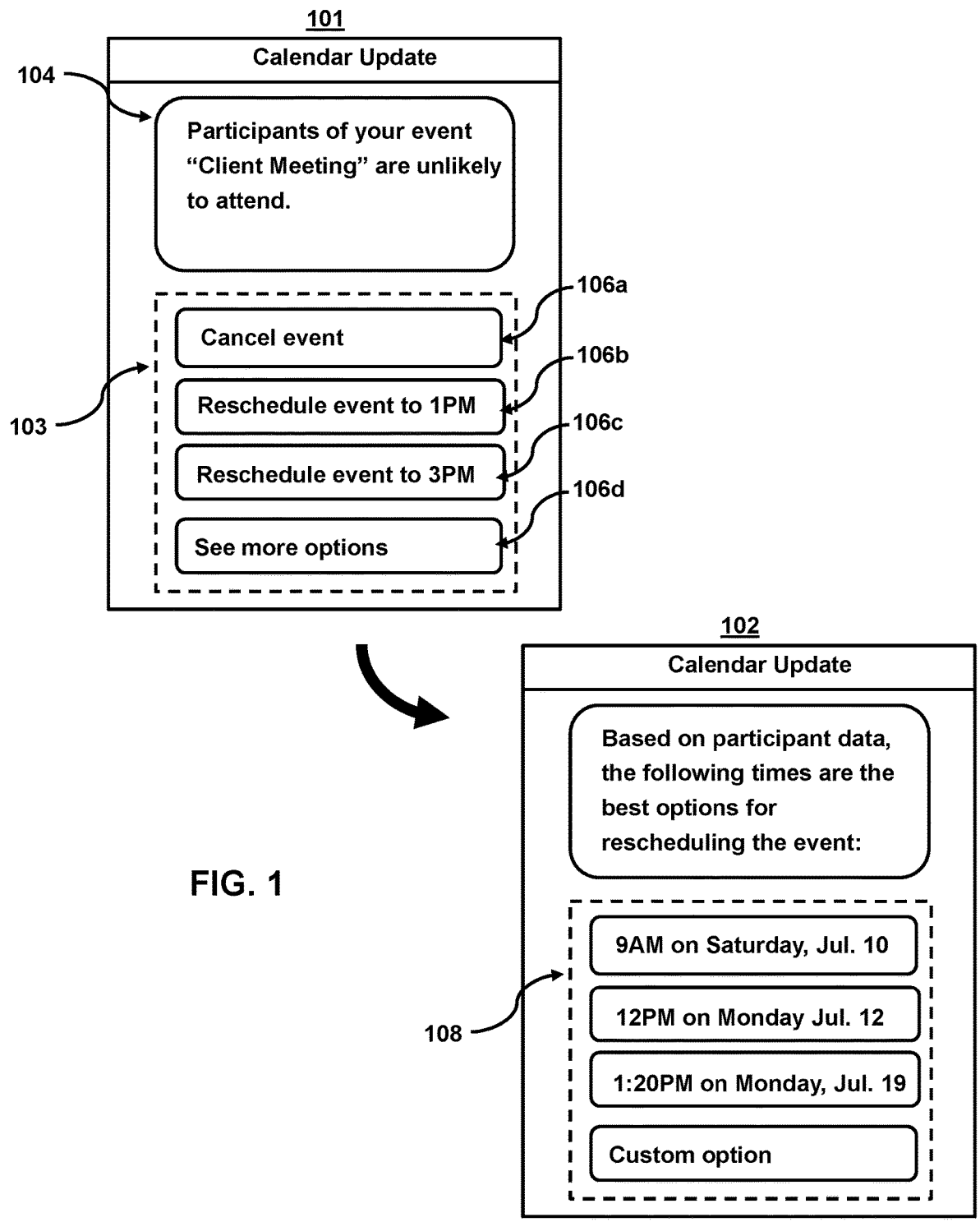
FIG. 1 shows an illustrative diagram for a user interface for presenting recommendations for modifying events using artificial intelligence models based on network conditions, in accordance with one or more embodiments.

FIG. 1 shows an illustrative diagram for a user interface for presenting recommendations for modifying events using artificial intelligence models based on network conditions, in accordance with one or more embodiments. For example, FIG. 1 shows user interface 101. As referred to herein, a "user interface" may comprise a human-computer interaction and communication in a device, and may include display screens, keyboards, a mouse, and the appearance of a desktop. For example, a user interface may comprise a way a user interacts with an application or a website.

The system (e.g., a mobile application) may generate for display, on the user device interface 101, a recommendation for modifying an event. The recommendation may comprise various types of content. As referred to herein, "content" should be understood to mean an electronically consumable user asset, such as Internet content (e.g., streaming content, downloadable content, Webcasts, etc.), video clips, audio, content information, pictures, rotating images, documents, playlists, web sites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

The system may take one or more actions related to an event and events may comprise one or more activities. As referred to herein, an event may comprise any occurrence. For example, the event may be a meeting (e.g., online meeting, in-person meeting, etc.). In some embodiments, the event may comprise a scheduled event (e.g., an event detected based on an electronic record corresponding to a user). For example, the system may retrieve information about a given user or user device to identify potential events and/or conflicts with the potential events. In some embodiments, the system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on active or passive monitoring by the system. Furthermore, in some embodiments, the user profile may include one or more thresholds (e.g., as described herein) that are specific to the user and/or one or more network conditions. In some embodiments, the user profile may include advanced metrics for example thresholds specific to a combination of one or more network conditions and/or one or more types of events (e.g., a given event type may correspond to a given network condition threshold).

Based on network conditions of user devices such as high levels of noise and/or movement, a system may determine that the user devices are not available (e.g., do not have enough available bandwidth) and determine that the meeting is likely to be modified (e.g., should be rescheduled or moved). As described herein, the network conditions may be sensed or sourced from a variety of different sensors or devices connected (e.g., wireless connection, wired connection, etc.) to the user devices. For example, in one particular case, the user device interface 101 can recommend rescheduling a meeting if all of the participants are in an area with loud noise, as this may indicate that the participants are not available to attend the meeting.

In some embodiments, network conditions may comprise a data stream specific to a given data source. For example, "a data stream" may refer to data that is received from a data source that is indexed or archived by time. This may include streaming data or may refer to data that is received from one or more sources over time (e.g., either continuously or in a sporadic nature). A data stream segment may refer to a state or instance of the data stream. For example, a state or instance may refer to a current set of data corresponding to a given time increment or index value. For example, the system may receive time series data as a data stream. A given increment (or instance) of the time series data may correspond to a data stream segment.

As described herein, "time-series data" may include a sequence of data points that occur in successive order over some period of time. In some embodiments, time-series data may be contrasted with cross-sectional data, which captures a point in time. A time series can be taken on any variable that changes over time. The system may use a time series to track a network condition (e.g., noise level) corresponding to a user device over time. The system may track the network condition over the short term, such as the noise level currently, over the hour, over the course of a business day, or over the long term, such as an average noise level corresponding to the user device.

In some embodiments, the system may perform a time series analysis to generate a metric corresponding to a network condition. For example, a time series analysis may be useful to determine how a given noise level or other network condition changes over time. The system can also use the analysis to predict how the changes associated with the chosen data point compare to shifts in other variables over the same time period (e.g., if a user is more frequently modifying events based on particular network conditions).

Figure 2:
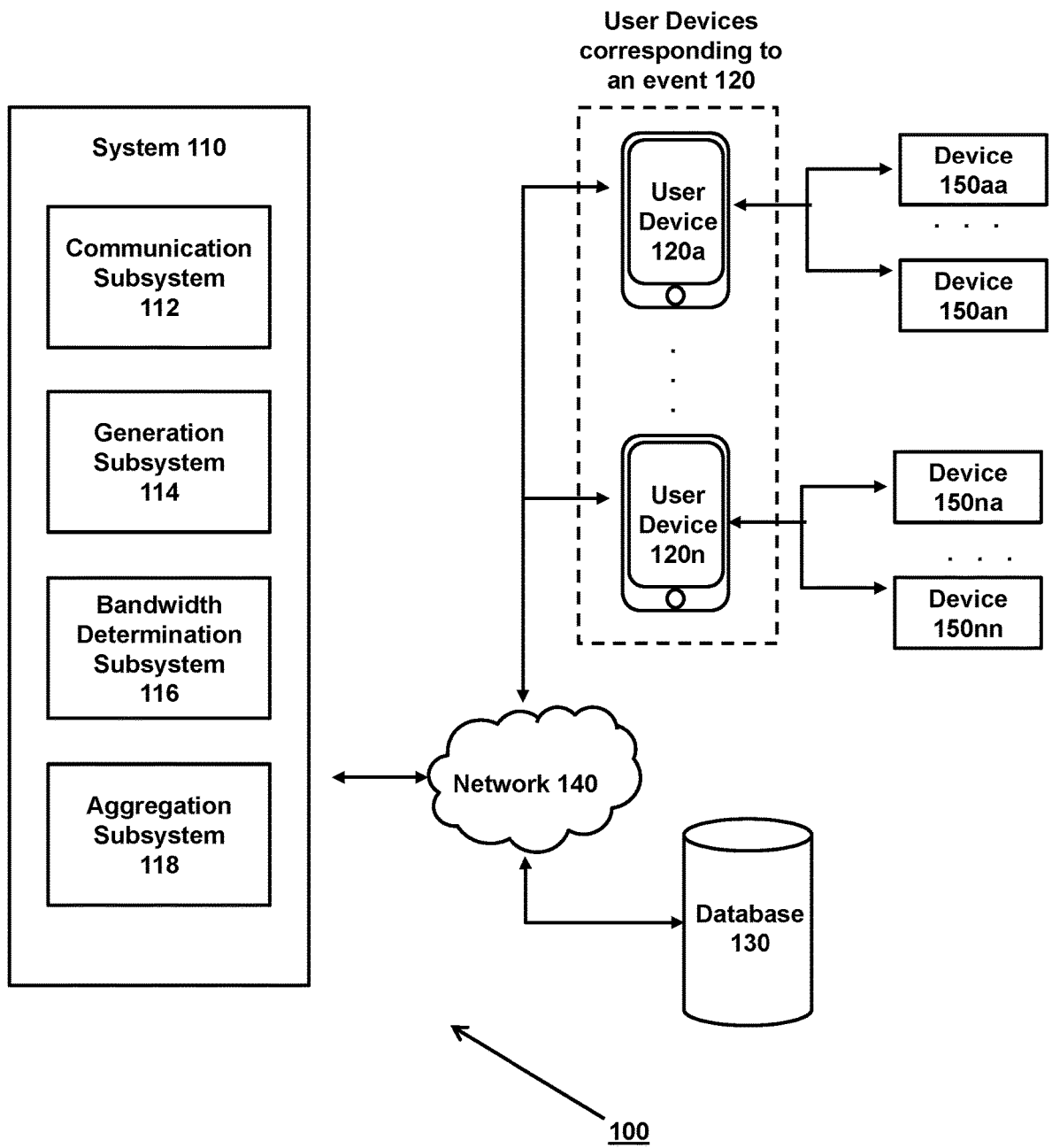
FIG. 2 shows an illustrative environment for modifying scheduled events based on bandwidth availability, in accordance with one or more embodiments of this disclosure.

A system for generating recommendations for modifying the event is described with relation to FIG. 2. The system (e.g., system 110 of FIG. 2) may use the network conditions to determine if the event should be modified, for example, by inputting the network conditions into a trained model. The model may output recommendations for modifications that should be made to the event. The trained model may be, for example, trained on historic network conditions corresponding to previous events and how the previous events were modified to train an artificial intelligence (AI) model. When the system (e.g., system 110 of FIG. 2) generates one or more recommendations, the user device interface 101 may display the recommendations. For example, prior to the event (e.g., within a predetermined period of time before the event), user device interface 101 may display a notification 104 that users or user devices corresponding to the event (e.g., users/user devices that indicated that they would attend a meeting) are likely unavailable or will likely not have enough available bandwidth to participate in the event (e.g., as described in relation with FIG. 2). In some examples, available bandwidth may be measured by an available bandwidth metric.

As referenced herein, network conditions may include a combination of one or more conditions that may impact a user and/or user device's availability at a given time. Network conditions can include environmental factors, such as noise level, location, network connectivity (e.g., internet connection), etc. For example, a loud noise level may indicate that a user or user device is likely to be unavailable. Similarly, if the user and/or user device has low quality internet connection, the user and/or user device may be unable to participate in an event such as a meeting. Alternatively or additionally, the network conditions may include a user and/or user device's participation in another event. For example, if a user and/or user device is currently in a meeting or phone call, it may indicate that a user and/or user device will be less likely to have sufficient available bandwidth to participate in an event in the proximate future. In some examples, if a user or user device is assigned to many tasks or projects (e.g., unrelated to the event and with incoming deadlines), it may also indicate that a user and/or user device will be less likely to have sufficient available bandwidth to participate in an event in the proximate future. In some examples, network conditions may encompass any combination of different conditions of a user and/or user device.

As referenced herein, an available bandwidth metric may indicate a measure of available bandwidth a user or user device may have. In some examples, the available bandwidth metric may be an estimate of a measure of available bandwidth or may alternatively include a likelihood that a user/user device is unavailable. The available bandwidth metric may be a qualitative metric (e.g., "busy," "very busy," "free," etc.) or may be a quantitative amount (e.g., 83% likely to be unavailable during the scheduled event, etc.). In some cases, the available bandwidth metric may be a distractibility score, which may indicate if a user is likely to be distracted during the scheduled event. As described herein, the available bandwidth metric may be determined by an artificial intelligence model trained to determine the available bandwidth metric. For example, the AI model may be able to classify the user or user device as having different levels of availability, or may use regression to identify a percent or value corresponding to the availability level of the user/user device.

The system may recommend one or more recommendations such as recommendations 106a-106d. For example, the system may recommend a recommendation to cancel the event 106a or several options to reschedule the event 106b-106c. In some examples, certain recommendations may be recommended over others based on one or more other conditions.

For example, certain times may be recommended over others based on anticipated availability of users/user devices corresponding to the event. In one example, if a user device associated with a user indicates that a user will be unavailable or have low bandwidth (e.g., a list of tasks for the user device or a user listing several tasks due around the time of the event, etc.) then the system may recommend and display recommendations that are for alternative times when users/ user devices are available or have the most bandwidth. Alternatively or additionally, certain times may be recommended over others based on the importance or urgency of the event. For example, the event may be related to a task that is due or urgent. In this example, recommendations may be based on times that are available as soon as possible, or prior to a deadline. In some embodiments, times may be recommended based on one or more conditions related to the users, user devices, events, and/or tasks related to the events. The recommendations may be based on a function of these conditions, for example, some conditions may be weighed more heavily (e.g., due to predetermined options as specified by an administrator of an event). In some examples, in response to a user selection of response 106d, the system may generate user interface 102. User interface 102 may include further recommendations 108 for times for rescheduling an event.

The user interface 101 and 102 may also be used to modify the event based on a selection of a recommendation. For example, the user interface 101 and/or 102 may be used to receive a selection for a modification of the event based on the recommendation (e.g., a user of the user interface may click or touch a recommendation to select) and in response to receiving the selection, the system (e.g., the system 110) may modify the event based on the selection.

As described herein, aspects of the present invention include a system that generates one or more recommendations for modifying an event based on network conditions of user devices corresponding to the event. FIG. 2 shows an illustrative environment 100 that may be used for modifying scheduled events based on bandwidth availability with exemplary system 110, in accordance with one or more embodiments of this disclosure. Illustrative environment 100 includes system 110, user devices 120a-120n, and database 130. The system 110 may execute one or more instructions for modifying scheduled events based on bandwidth availability. System 110 may include software, hardware, or a combination of the two. For example, system 110 may be hosted on a physical server or a virtual server that is running on a physical computer system. In some embodiments, system 110 may be configured on a user device such as a laptop computer, a smart phone, a desktop computer, an electronic tablet, or any other suitable user device.

User devices 120a-120n may be user devices associated with one or more users. The user devices may include devices that correspond to an event (e.g., a scheduled event such as a meeting). The system 110 may determine a plurality of user devices 120a-120n that correspond to an event, for example, based on user device inputs indicating a participation at an event (e.g., an RSVP, a response affirmatively expressing participation in the event, a lack of response indicating that a user device will not participate, etc.). As used herein, a user device may refer to any computing device described herein (e.g., described in reference to FIG. 3).

Each of the user devices 120a-120n may be connected to one or more other devices (e.g., sensors, etc.). For example, user device 120a may be connected to devices 150aa-150an, while user device 120n may be connected to devices 150na-150nn. The devices may be used to sense network conditions, e.g., based on location, noise, whether the user device is currently moving, and/or other suitable conditions. In some cases, the network conditions may be used to determine whether users associated with each of the user devices would be likely to be distracted or otherwise unavailable from attending and/or participating in a scheduled event. For example, the devices may include a Global Positioning System (GPS), CarPlay/Android Auto, etc. and the network conditions may indicate whether a user device is in motion, whether Global Positioning System (GPS) and/or CarPlay/Android Auto is in use, whether the user device is in a public location and/or a combination of the above. The system may receive the first network conditions from the user devices, for example, via a network such as network 140. In some examples, the system may receive the first network conditions from a database or devices in communication with user devices.

As described herein, the system 110 may be used to modify scheduled events based on bandwidth availability. System 110 includes subsystems such as communication subsystem 112, generation sub system 114, bandwidth determination sub system 116, and aggregation sub system 118. User devices 120a-120n may correspond to users who indicated that they would participate in an event (e.g., by attending, etc.), and system 110 may use data from the user devices (e.g., 120a-120n) to generate a recommendation for modifying the event (e.g., canceling the event, rescheduling the event, etc.). For example, the system 110 may obtain the data via communication subsystem 112.

Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive data from one or more user devices 120a-120n, for example, through the network 140. For example, the user devices may have data, such as data associated with the user and transmit the data to the system 110. In the ongoing example, the user devices 120a-120n may transmit data such as network conditions to the system 110 via communication subsystem 112. Communication subsystem 112 may pass at least a portion of the network conditions data from the database or user devices, or a pointer to the data in memory, to generation subsystem 114.

Generation subsystem 114 may use the network conditions (e.g., an amount of background noise, calendar conflicts, and/or anything else that may distract a user) from the user devices to generate a feature input (e.g., for inputting into a trained model). For example, generating the feature input may include reformatting the data from the user device(s) and/or generating a data structure with the network conditions data from the user device(s). In some examples, the generation subsystem 114 may apply data normalization or other processing functions (e.g., averaging, truncating, etc.) to the network conditions data to generate the feature input. Generation subsystem 114 may pass at least a portion of the feature input from the database or user devices, or a pointer to the data in memory, to bandwidth determination subsystem 116.

Bandwidth determination subsystem 116 may be configured to use the generated feature input to determine a first available bandwidth metric for the first user device. For example, the bandwidth determination subsystem may input the feature input into an artificial intelligence model in order to determine whether the first user device has sufficient available bandwidth (e.g., exceeding or not exceeding a threshold), wherein the artificial intelligence model is trained to determine available bandwidth metrics based on historic network conditions corresponding to a plurality of previous events and event modification data for the plurality of previous events.

Once the bandwidth determination module 116 determines an available bandwidth metric of the first user device, the aggregation subsystem 118 may aggregate the available bandwidth metric of the first user device with respective available bandwidth metrics for other user devices of the plurality of user devices to determine a composite available bandwidth metric for the plurality of user devices.

When the bandwidth determination module 116 determines a composite available bandwidth, the system 110 may further compare the composite available bandwidth metric to a threshold available bandwidth metric. In response to determining that the composite available bandwidth metric equals or exceeds the threshold available bandwidth metric, the system may generate for display, on a user device interface, a recommendation for modifying the event. One example of recommendations displayed on the user device interface include the user device interfaces 101 and 102 of FIG. 1.

Database 130 may be used to store various data, including bandwidth availability data, data corresponding to the user device, network condition data such as data from the one or more devices of any of the user devices, and and/or other suitable data. Database 130 may be stored on a file system, or alternatively may be hosted on computer clusters or cloud storage. The database may be hosted on, for example, a physical server or a virtual server that is running on a physical computer system. Database 130 may include a first training dataset including historic network conditions (e.g., indicating a respective available bandwidth of the first user device at a time of a respective previous event) corresponding to previous events for a user device. The database 130 may also include a second training dataset including the event modification data for the previous events for the user device, such as whether a respective previous event was modified, and how. For example, for a first user such as a patient A, the data sources may include previously scheduled doctor visits and network conditions prior to each (e.g., was the patient's device in motion prior to the visit, was the patient's location loud or quiet, etc.). The database 130 may also include, for each scheduled doctor visit, whether it was rescheduled, kept at the original time, or canceled. Network 140 may include any wired or wireless network, including local area network, wide area network (e.g., the Internet), or a combination of the two.

Figure 3:
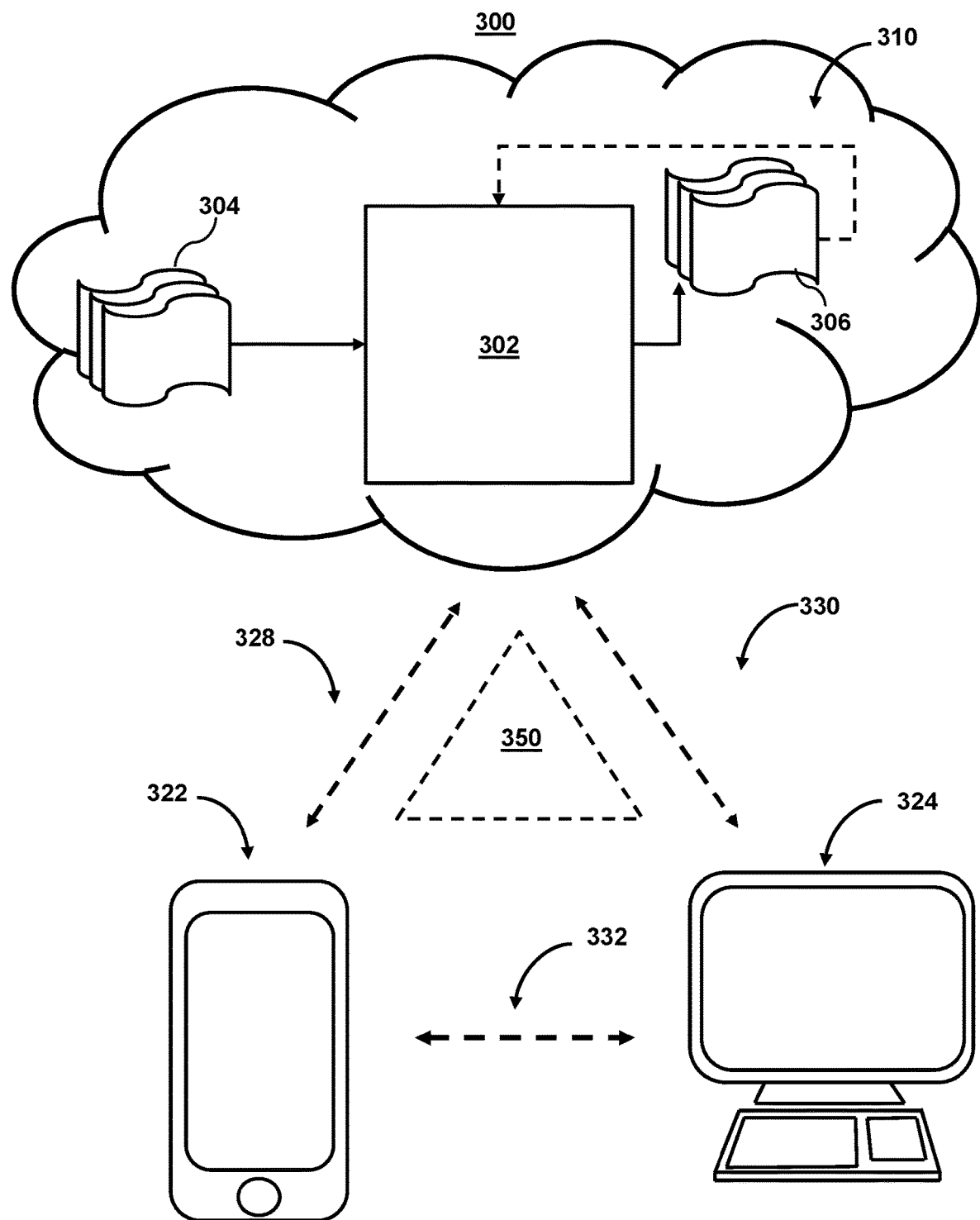
FIG. 3 shows illustrative components for a system used to modify scheduled events based on bandwidth availability, in accordance with one or more embodiments.

FIG. 3 shows illustrative components for a system used to modify scheduled events based on bandwidth availability, in accordance with one or more embodiments. For example, FIG. 3 may show illustrative components for modifying scheduled events based on bandwidth availability. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices.

Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include the system 110, user devices 120a-120n, network 140, and/or database 130. Cloud components 310 may access data sources such as from database 130, e.g., through communication subsystem 114. The data sources may include a first training dataset including historic network conditions (e.g., indicating a respective available bandwidth of the first user device at a time of a respective previous event) corresponding to previous events for a user device. The data sources may also include a second training dataset including the event modification data for the previous events for the user device, such as whether a respective previous event was modified, and how. For example, for a first user, such as a patient A, the data sources may include previously scheduled doctor visits and network conditions prior to each (e.g., was the patient's device in motion prior to the visit, was the patient's location loud or quiet, etc.). The data sources may also include, for each scheduled doctor visit, whether it was rescheduled, kept at the original time, or canceled.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., whether or not an event is likely to be modified based on network conditions, and/or a likelihood of the event being modified based on the network conditions).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether or not an event is likely to be modified based on network conditions).

In some embodiments, the model (e.g., model 302) may automatically perform actions based on outputs 306. In some embodiments, the model (e.g., model 302) may not perform any actions. The output of the model (e.g., model 302) may be used in generating for display, e.g., on a user device interface, a recommendation for modifying an event.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer, where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
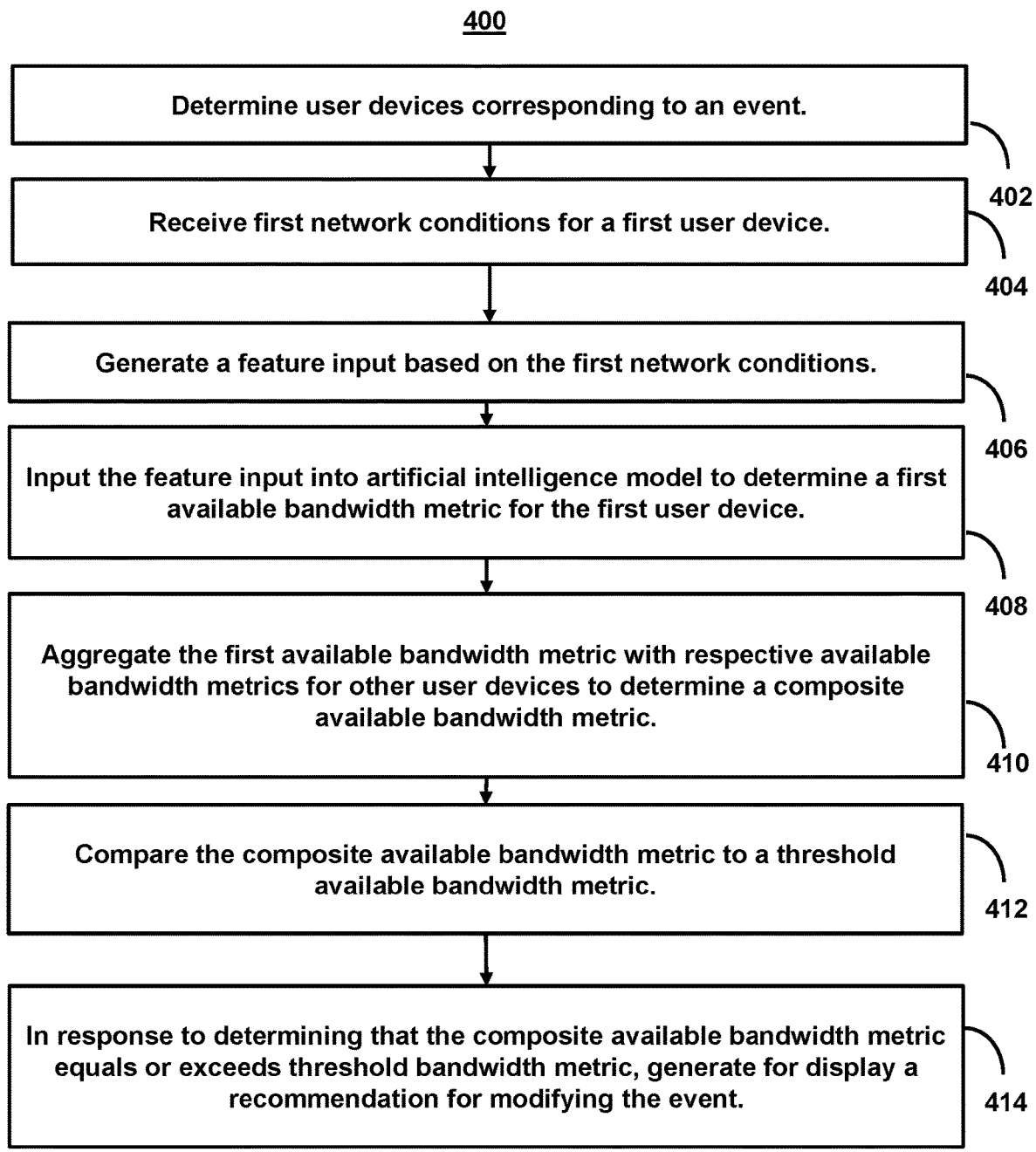
FIG. 4 shows a flowchart of the steps involved in modifying scheduled events based on bandwidth availability, in accordance with one or more embodiments.

FIG. 4 shows a flowchart of the steps of process 400 involved in modifying scheduled events based on bandwidth availability, in accordance with one or more embodiments. For example, the system may use components described in relation to FIGS. 2 and 3 to execute or implement process 400, in particular, to train and use artificial intelligence models to use as mechanisms for determining when user devices may lack bandwidth availability.

At step 402, the system may determine user devices corresponding to an event (e.g., a meeting). For example, the system may determine, based on user device inputs indicating a participation at an event, a plurality of user devices corresponding to the event, for example, an upcoming meeting. In one particular example, the system may determine that one or more user devices correspond to an event if the one or more user devices or users associated with the user devices submit a response, e.g., to a meeting invite indicating that users associated with the user devices will attend the event (e.g., meeting), for example, by attending the event online or in-person. By doing so, the system may determine all user devices for which it needs to receive an available bandwidth metric and/or the number of user devices that may be used for determining a composite available bandwidth metric.

At step 404, the system may receive first network conditions for a first user device (e.g., of the multiple user devices). In some examples, the system may receive, prior to the event (e.g., meeting), first network conditions indicating a level of background noise at a location of the first user device. Alternatively or additionally, the first network conditions may indicate whether a user device is in motion, whether Global Positioning System (GPS) and/or CarPlay/Android Auto is in use, whether the user device is in a public location, and/or a combination of the above. The system may receive the first network conditions from the user devices, for example, via a network such as network 140. In some examples, the system may receive the first network conditions from a database or devices in communication with user devices and/or the system. By doing so, the system may determine a quantitative measurement for use in determining a metric that is conventionally described in a qualitative fashion (e.g., how distracted the user is, etc.).

At step 406, the system may generate a feature input based on the first network conditions. For example, the feature input may be of a specified format. The feature input may be used to input data to the artificial intelligence model described herein. In some examples, data normalization or other processing functions (e.g., averaging, truncating, etc.) may be applied to the first network conditions to generate the feature input. By doing so, the system may generate an array of values that may be inputted and processed in an artificial intelligence model. For example, if the system did not generate a standardized feature input, the system may need to calibrate each artificial intelligence model based on a specific network condition type (e.g., noise, location, etc.). By generating the feature input, the system avoids the need to do this.

At step 408, the system may input the feature input into an artificial intelligence model to determine a first available bandwidth metric for the first user device. The artificial intelligence (AI) model may be trained to determine available bandwidth metrics based on historic network conditions corresponding to a plurality of previous events and event modification data for the plurality of previous events. In one particular example, the AI model may be trained to determine a likelihood that a user device or a user associated with the user device will participate in the event based on the network conditions such as background noise detected, location of the user device, and/or the like. In this example, the AI model may be trained using previous network conditions (e.g., background noise, location of the user, etc.) of the first user device for previous events and how the event was modified (e.g., whether the event was canceled, was rescheduled for a different time, or continued on). The AI model may include any suitable trained model. For example, the AI model may include a neural network (e.g., Artificial Neural Network (ANN), Convolution Neural Network (CNN), or a Recurrent Neural Network (RNN)), a random forest classifier, regression, etc. By using the trained model, the system is able to leverage data from previous events specific to a user or user device in order to determine a more accurate metric for available bandwidth accurate to each user/user device. When determining a composite metric for multiple users/user devices, the composite metric can also leverage models trained for groups of users and user devices.

In some embodiments, training the artificial intelligence model may include receiving a first training dataset comprising the historic network conditions corresponding to the plurality of previous events for the first user device, wherein historic network conditions indicate a respective available bandwidth of the first user device at a time of a respective previous event. Training the AI model may further include receiving a second training dataset comprising the event modification data for the plurality of previous events for the first user device, wherein the event modification data indicates whether a respective previous event was modified and training the artificial intelligence model to determine an amount of network conditions likely to correspond to modification of an upcoming event by the first user device. For example, training the AI model to determine an amount of network conditions likely to correspond to modification can include training the AI model to determine a threshold for available bandwidth metric.

At step 410, the system may aggregate the first available bandwidth metric with respective available bandwidth metrics for other user devices to determine a composite available bandwidth metric. In some examples, the system may aggregate the first available bandwidth metric with respective available bandwidth metrics for other user devices of the plurality of user devices to determine a composite available bandwidth metric for the plurality of user devices. In one particular example, the system may aggregate the likelihood that a first user device is likely to participate in the event (e.g., whether a first user is likely to attend a meeting) with the likelihood that other user devices of the user devices indicating participation at the event will participate in the event (e.g., whether other users that had indicated they would attend an event are likely to actually attend). By doing so, the system is able to determine a composite metric that reflects availability of a group of users as a whole, and further use the composite metric to make recommendations for modifications to the event. In particular, by establishing conditions and rules to determine a function for calculating a composite metric (e.g., by weighing certain users and user devices differently to calculate the composite metric, for example, based on event data), the system may be enabled to make complex decisions on whether an event should be rescheduled or canceled.

At step 412, the system may compare the composite available bandwidth metric to a threshold available bandwidth metric. In some examples, the threshold available bandwidth metric is based on a composite amount of network conditions (e.g., noise level, movement, etc.) likely to correspond to modification of an upcoming event determined by applying a function based on one or more predetermined conditions to the amount of network conditions likely to correspond to modification of an upcoming event by the first user device and respective amounts for other user devices of the plurality of user devices. For example, the function may be that user device A must be likely to be able to participate in the event, but user device B is not important to the event, and so whether or not user device B is likely to be able to participate does not have an effect on the threshold. The predetermined conditions may include conditions for participating in the event such as everyone is required, no one is required, etc. By doing so, the system can compare available bandwidth of multiple users to an amount that is preset or predetermined by an administrator of the event.

At step 414, the system may, in response to determining that the composite available bandwidth metric equals or exceeds a threshold available bandwidth metric, generate for display a recommendation for modifying the event. For example, as shown in FIG. 1, the system may display that the event should be rescheduled to another time, canceled altogether, and/or kept at an original time. In some examples, the system may also recommend times to reschedule the event, e.g., based on the one or more user devices. In some examples, the recommendation may be one of a plurality of recommendations and the method may include selecting the recommendation from the plurality of recommendations. The system may also receive a selection for a modification of the event (e.g., a user may select a recommendation on the display) based on the recommendation and in response to receiving the selection, the system may modify the event based on the selection. In response to receiving the selection, the system may update the artificial intelligence model using the selection and the first network conditions. In other examples, the system itself may select the recommendation. By doing so, the system is able to alert a user and provide recommendations only when it's unlikely that the users or user devices will participate in an event or if it's likely that users will be distracted or have limited bandwidth during the event.

For example, the system may further determine a role of the first user device and select a recommendation from the plurality of recommendations based on the role. In the ongoing example, the system may determine that the first user device is associated with a first user who is part of a group (e.g., financial analysts) that is necessary to participate in the event. If the first user device has a low first available bandwidth metric (i.e., is unlikely or unable to participate in the event), the system may select a recommendation to cancel or reschedule the event (e.g., perhaps to a time when the first user device is indicated to be available).

In some examples, the system may further determine a future availability of the first user device and select a recommendation from the plurality of recommendations based on the future availability. In the ongoing example, the system may determine that the first user device is likely to be available in the future at one or more specific times. The system may select a recommendation to reschedule the event to a time when the first user device is indicated to be available.

In some examples, the system may further determine a type of the event and select a recommendation from the plurality of recommendations based on the type. In the ongoing example, the system may determine that the event is required for a specified group of people, e.g., financial analysts. The system may select a recommendation to cancel or reschedule the event (e.g., perhaps to a time when devices associated with financial analysts are indicated to be available).

In some examples, the system may further determine a type of the first network conditions and select the recommendation from a plurality of recommendations based on the type. For example, if the first network conditions of the first user device indicate that the first user associated with the first user device is on a call, the system may send a recommendation via email rather than text, e.g., since the first user is more likely to be able to respond or more likely to notice the recommendation.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising determining a plurality of user devices corresponding to an event, wherein the event occurs at a first time; receiving, at a second time, first network conditions for a first user device of the plurality of user devices, wherein the second time is prior to the first time; generating a feature input based on the first network conditions; inputting the feature input into an artificial intelligence model to determine a first available bandwidth metric for the first user device, wherein the artificial intelligence model is trained to determine available bandwidth metrics based on historic network conditions corresponding to a plurality of previous events and event modification data for the plurality of previous events; aggregating the first available bandwidth metric with respective available bandwidth metrics for other user devices of the plurality of user devices to determine a composite available bandwidth metric for the plurality of user devices; comparing the composite available bandwidth metric to a threshold available bandwidth metric; and in response to determining that the composite available bandwidth metric equals or exceeds threshold available bandwidth metric, generating for display, on a user device interface, a recommendation for modifying the event.

2. The method of any one of the preceding embodiments, wherein the artificial intelligence model is trained to determine available bandwidth metrics based on historic network conditions corresponding to the plurality of previous events and the event modification data for the plurality of previous events and wherein training the artificial intelligence model comprises: receiving a first training dataset comprising the historic network conditions corresponding to the plurality of previous events for the first user device, wherein historic network conditions indicate a respective available bandwidth of the first user device at a time of a respective previous event; receiving a second training dataset comprising the event modification data for the plurality of previous events for the first user device, wherein the event modification data indicates whether a respective previous event was modified; and training the artificial intelligence model to determine an amount of network conditions likely to correspond to modification of an upcoming event by the first user device.

3. The method of any one of the preceding embodiments, wherein the threshold available bandwidth metric is based on a composite amount of network conditions likely to correspond to modification of an upcoming event determined by applying a function based on one or more predetermined conditions to the amount of network conditions likely to correspond to modification of an upcoming event by the first user device and respective amounts for other user devices of the plurality of user devices.

4. The method of any one of the preceding embodiments, wherein the method further comprises determining a role of the first user device; and selecting the recommendation from a plurality of recommendations based on the role.

5. The method of any one of the preceding embodiments, wherein the method further comprises determining a future availability of the first user device and selecting the recommendation from a plurality of recommendations based on the future availability.

6. The method of any one of the preceding embodiments, wherein the method further comprises determining a type of the event and selecting the recommendation from a plurality of recommendations based on the type.

7. The method of any one of the preceding embodiments, wherein the method further comprises determining a type of the first network conditions and selecting the recommendation from a plurality of recommendations based on the type.

8. The method of any one of the preceding embodiments, wherein the method further comprises receiving a selection for a modification of the event based on the recommendation; and in response to receiving the selection, updating the artificial intelligence model using the selection and the first network conditions.

9. The method of any one of the preceding embodiments, wherein the method further comprises receiving a selection for a modification of the event based on the recommendation; and in response to receiving the selection, modifying the event based on the selection.

10. A tangible, non-transitory, machine-readable medium storing instructions that, when executed by a data processing apparatus, cause the data processing apparatus to perform operations comprising those of any of embodiments 1-9.

11. A system comprising one or more processors and memory storing instructions that, when executed by the processors, cause the processors to effectuate operations comprising those of any of embodiments 1-9.

12. A system comprising means for performing any of embodiments 1-9.

What is claimed is:

1. A system for modifying scheduled events based on bandwidth availability, the system comprising:
   determining, based on user device inputs indicating a participation at an event, a plurality of user devices corresponding to the event, wherein the event occurs at a first time;
   receiving, at a second time, first network conditions for a first user device of the plurality of user devices, wherein the second time is prior to the first time, wherein the first network conditions indicate a level of background noise at a location of the first user device;
   generating a feature input based on the first network conditions;
   inputting the feature input into an artificial intelligence model to determine a first available bandwidth metric for the first user device, wherein the artificial intelligence model is trained to determine available bandwidth metrics based on historic network conditions corresponding to a plurality of previous events and event modification data for the plurality of previous events by:
      receiving a first training dataset comprising the historic network conditions corresponding to the plurality of previous events for the first user device, wherein historic network conditions indicate a respective available bandwidth of the first user device at a time of a respective previous event;
      receiving a second training dataset comprising the event modification data for the plurality of previous events for the first user device, wherein the event modification data indicates whether the respective previous event was modified;
      training the artificial intelligence model to determine an amount of network conditions likely to correspond to modification of an upcoming event by the first user device;
   aggregating the first available bandwidth metric with respective available bandwidth metrics for other user devices of the plurality of user devices to determine a composite available bandwidth metric for the plurality of user devices;
   comparing the composite available bandwidth metric to a threshold available bandwidth metric; and
   in response to determining that the composite available bandwidth metric equals or exceeds the threshold available bandwidth metric, generating for display, on a user device interface, a recommendation for modifying the event.

2. A method for modifying scheduled events based on bandwidth availability, the method comprising:
   determining a plurality of user devices corresponding to an event, wherein the event occurs at a first time;
   receiving, at a second time, first network conditions for a first user device of the plurality of user devices, wherein the second time is prior to the first time, wherein the first network conditions indicate a level of background noise at a location of the first user device;
   generating a feature input based on the first network conditions;
   inputting the feature input into an artificial intelligence model to determine a first available bandwidth metric for the first user device, wherein the artificial intelligence model is trained to determine available bandwidth metrics based on historic network conditions corresponding to a plurality of previous events and event modification data for the plurality of previous events by training the artificial intelligence model to determine an amount of network conditions likely to correspond to modification of an upcoming event by the first user device;
   aggregating the first available bandwidth metric with respective available bandwidth metrics for other user devices of the plurality of user devices to determine a composite available bandwidth metric for the plurality of user devices;
   comparing the composite available bandwidth metric to a threshold available bandwidth metric; and
   in response to determining that the composite available bandwidth metric equals or exceeds the threshold available bandwidth metric, generating for display, on a user device interface, a recommendation for modifying the event.

3. The method of claim 2, wherein the artificial intelligence model is trained to determine available bandwidth metrics based on historic network conditions corresponding to the plurality of previous events and the event modification data for the plurality of previous events and wherein training the artificial intelligence model comprises:
   receiving a first training dataset comprising the historic network conditions corresponding to the plurality of previous events for the first user device, wherein historic network conditions indicate a respective available bandwidth of the first user device at a time of a respective previous event;
   receiving a second training dataset comprising the event modification data for the plurality of previous events for the first user device, wherein the event modification data indicates whether the respective previous event was modified; and
   training the artificial intelligence model to determine an amount of network conditions likely to correspond to modification of an upcoming event by the first user device.

4. The method of claim 2, wherein the threshold available bandwidth metric is based on a composite amount of network conditions likely to correspond to modification of an upcoming event determined by applying a function based on one or more predetermined conditions to the amount of network conditions likely to correspond to modification of an upcoming event by the first user device and respective amounts for other user devices of the plurality of user devices.

5. The method of claim 2, further comprising:
determining a role of the first user device; and
selecting the recommendation from a plurality of recommendations based on the role.

6. The method of claim 2, further comprising:
determining a future availability of the first user device; and
selecting the recommendation from a plurality of recommendations based on the future availability.

7. The method of claim 2, further comprising:
determining a type of the event; and
selecting the recommendation from a plurality of recommendations based on the type.

8. The method of claim 2, further comprising:
determining a type of the first network conditions; and
selecting the recommendation from a plurality of recommendations based on the type.

9. The method of claim 2, further comprising:
receiving a selection for a modification of the event based on the recommendation; and
in response to receiving the selection, updating the artificial intelligence model using the selection and the first network conditions.

10. The method of claim 2, further comprising:
receiving a selection for a modification of the event based on the recommendation; and
in response to receiving the selection, modifying the event based on the selection.

11. A non-transitory, computer-readable medium storing instructions that, when executed by one or more processors, cause the one or more processors to perform operations comprising:
determining a plurality of user devices corresponding to an event, wherein the event occurs at a first time;
receiving, at a second time, first network conditions for a first user device of the plurality of user devices, wherein the second time is prior to the first time, wherein the first network conditions indicate a level of background noise at a location of the first user device;
generating a feature input based on the first network conditions;
inputting the feature input into an artificial intelligence model to determine a first available bandwidth metric for the first user device, wherein the artificial intelligence model is trained to determine available bandwidth metrics based on historic network conditions corresponding to a plurality of previous events and event modification data for the plurality of previous events by training the artificial intelligence model to determine an amount of network conditions likely to correspond to modification of an upcoming event by the first user device;
aggregating the first available bandwidth metric with respective available bandwidth metrics for other user devices of the plurality of user devices to determine a composite available bandwidth metric for the plurality of user devices;
comparing the composite available bandwidth metric to a threshold available bandwidth metric; and
in response to determining that the composite available bandwidth metric equals or exceeds the threshold available bandwidth metric, generating for display, on a user device interface, a recommendation for modifying the event.

12. The non-transitory, computer-readable medium of claim 11, wherein the artificial intelligence model is trained to determine available bandwidth metrics based on historic network conditions corresponding to the plurality of previous events and the event modification data for the plurality of previous events and wherein training the artificial intelligence model comprises:
receiving a first training dataset comprising the historic network conditions corresponding to the plurality of previous events for the first user device, wherein historic network conditions indicate a respective available bandwidth of the first user device at a time of a respective previous event;
receiving a second training dataset comprising the event modification data for the plurality of previous events for the first user device, wherein the event modification data indicates whether the respective previous event was modified; and
training the artificial intelligence model to determine an amount of network conditions likely to correspond to modification of an upcoming event by the first user device.

13. The non-transitory, computer-readable medium of claim 11, wherein the threshold available bandwidth metric is based on a composite amount of network conditions likely to correspond to modification of an upcoming event determined by applying a function based on one or more predetermined conditions to the amount of network conditions likely to correspond to modification of an upcoming event by the first user device and respective amounts for other user devices of the plurality of user devices.

14. The non-transitory, computer-readable medium of claim 11, wherein the instructions cause the one or more processors to perform operations further comprising:
determining a role of the first user device; and
selecting the recommendation from a plurality of recommendations based on the role.

15. The non-transitory, computer-readable medium of claim 11, wherein the instructions cause the one or more processors to perform operations further comprising:
determining a future availability of the first user device; and
selecting the recommendation from a plurality of recommendations based on the future availability.

16. The non-transitory, computer-readable medium of claim 11, wherein the instructions cause the one or more processors to perform operations further comprising:
determining a type of the event; and
selecting the recommendation from a plurality of recommendations based on the type.

17. The non-transitory, computer-readable medium of claim 11, wherein the instructions cause the one or more processors to perform operations further comprising:
determining a type of the first network conditions; and
selecting the recommendation from a plurality of recommendations based on the type.

18. The non-transitory, computer-readable medium of claim 11, wherein the instructions cause the one or more processors to perform operations further comprising:
receiving a selection for a modification of the event based on the recommendation; and
in response to receiving the selection, updating the artificial intelligence model using the selection and the first network conditions.

19. The non-transitory, computer-readable medium of claim 11, wherein the instructions cause the one or more processors to perform operations further comprising:
receiving a selection for a modification of the event based on the recommendation; and in response to receiving the selection, modifying the event based on the selection.

20. The non-transitory, computer-readable medium of claim 11, wherein the recommendation comprises rescheduling the event to a third time.

\* \* \* \* \*